Aug. 13, 1935.  G. E. BLAGG ET AL  2,011,433
PIPE COUPLING
Filed March 25, 1933  2 Sheets-Sheet 1
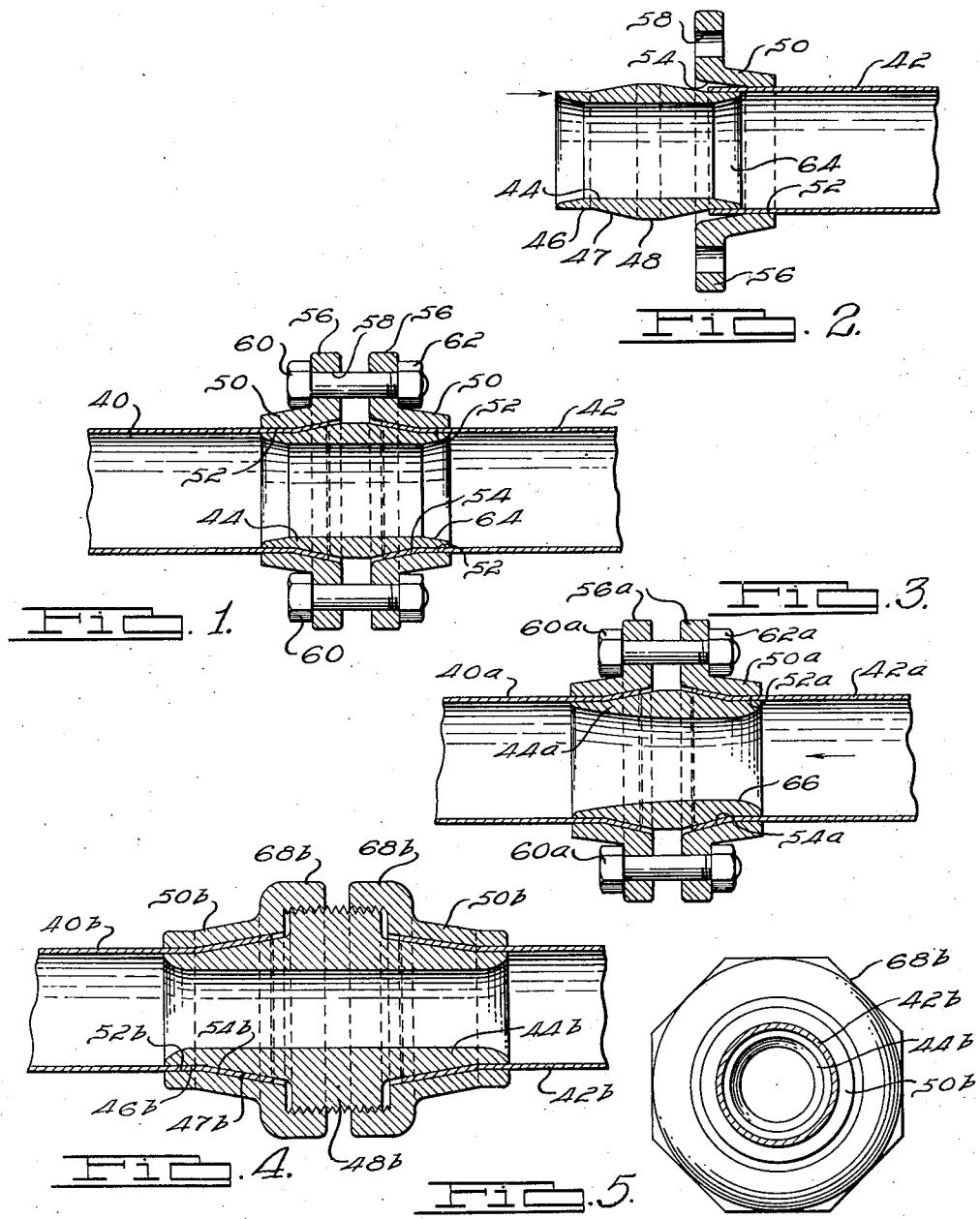
INVENTORS.
Gabriel E. Blagg,
Rudolph F. Flintermann.
BY
Harness, Dickey, Pierce & Hann.
ATTORNEYS.

Aug. 13, 1935.  G. E. BLAGG ET AL  2,011,433
PIPE COUPLING
Filed March 25, 1933  2 Sheets-Sheet 2
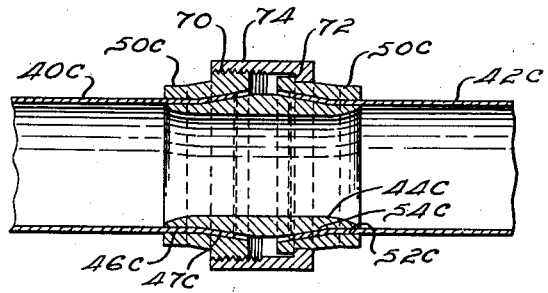
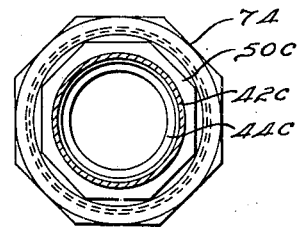
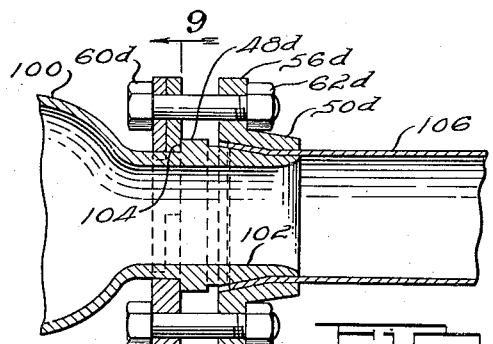
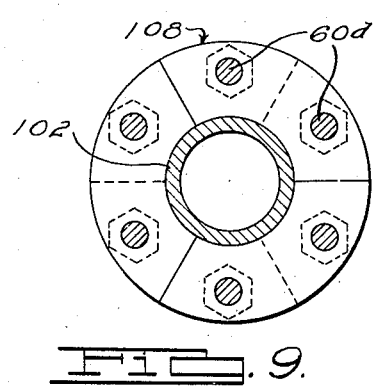
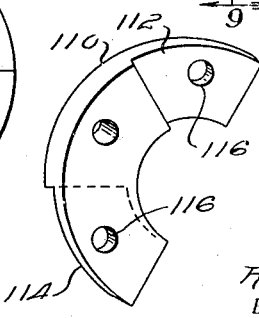
INVENTORS.
Gabriel E. Blagg,
Rudolph F. Flintermann.
BY
Harness, Dickey, Pierce & Hann.
ATTORNEYS.

Patented Aug. 13, 1935

2,011,433

UNITED STATES PATENT OFFICE 2,011,433

PIPE COUPLING

Gabriel E. Blagg and Rudolph F. Flintermann, Detroit, Mich.; Augusta D. Flintermann, executrix of said Rudolph F. Flintermann, deceased, assignors to Michigan Steel Casting Company, Detroit, Mich., a corporation of Michigan Application March 25, 1933, Serial No. 662,752

1 Claim. (Cl. 285—71)

This invention relates to couplings for pipes or tubes and it has particular relation to an improved type of coupling for use in connection with thin walled tubing.

Objects of the invention include the provision of a simple and efficient coupling for thin wall tubing; to provide such a coupling in which no substantial preliminary operation on the pipe is necessary before making the coupling; to provide such a coupling in which a perfectly tight joint is effected without the use of packing; to provide such a coupling in which the flow of fluid is not materially restricted; and to provide a coupling particularly adaptable for use in connection with tubes made of such types of alloy metals as are liable to change their structure and/or properties by working, and which will obviate working of the metal of the tube to such an extent as to effect any material change in the structure and/or properties thereof; to provide a coupling particularly adaptable for use in connection with tubing employed in the transfer of relatively corrosive fluids, and to provide a coupling particularly adaptable for use in connection with thin wall tubes formed from metal containing a material percentage of chromium and nickel as an alloy thereof.

Other objects include the provision of a tube coupling comprising an inner guiding and expansion sleeve receivable in part within the end of a tube, and a cooperating clamping member; the provision of a tube coupling including an inner sleeve member having a cylindrical end portion of substantially the same outside diameter as the normal inside diameter of the tube to be coupled thereby, the sleeve further having a frusto-conical surface joining said cylindrical end portion and adapted to be at least partially forced into the end of the tube whereby to cause said end to be expanded, and a clamping ring having a frusto-conical surface complementary to the frusto-conical surface of the sleeve for clamping the expanded end of the tube between it and the sleeve; the provision of a tube coupling including a sleeve adapted to be received in part in the end of a pipe to be coupled and an exterior clamping ring adapted to clamp the end of the tube to the sleeve, the inner surface of the sleeve being shaped to approximately Venturi shape; the provision of a tube coupling including a sleeve adapted to be received in part in the end of a pipe to be coupled and an exterior clamping ring adapted to clamp the end of the tube to the sleeve, the inner surface of the sleeve being shaped to approximately Venturi shape; the provision of a tube coupling including a sleeve having a cylindrical end portion of an outside diameter substantially the same as the inside diameter of the tube to be coupled and having a frusto-conical surface bounding said cylindrical portion, the cylindrical portion adapted to serve as a guide for the sleeve in the tube and the frusto-conical surface adapted to flare the end of the pipe thereon when forced thereinto, and a clamping ring encircling the tube and sleeve and having surfaces complementary to said cylindrical portion and said frusto-conical portion.

Further objects include the provision of new and novel means for coupling the end of a thin walled tube to a cast metal object; to provide a novel form of connection between a cast metal object and a thin walled tube; and to provide a novel form of coupling between a thin walled tube and an object such as a valve body or other part conventionally employed in lines of piping.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention, and in which like numerals refer to like parts throughout the several different views, Fig. 1 is a sectional view taken longitudinally through the axis of a form of pipe or tube coupling and cooperating tube sections constructed in accordance with the present invention.

Fig. 2 is a sectional view taken through the axis of two parts of the coupling indicated in Fig. 1 and corresponding tube section, ilustrating the preferred method followed in assembly thereof.

Fig. 3 is a view similar to Fig. 1 but illustrating a slight modification.

Fig. 4 is a view similar to Fig. 1 but illustrating another modified form of construction.

Fig. 5 is an end view of the construction shown in Fig. 4.

Figs. 6 and 7 are views corresponding to Figs. 4 and 5 and illustrating a still further modification of the invention.

Fig. 8 is a partially broken partially sectioned view taken axially through a coupling between a thin walled tube and a valve or other body.

Fig. 9 is a sectional view taken on the line 11—11 of Fig. 8.

Fig. 10 is a perspective view of one of the sections of the clamping collar shown mounted on the valve body in Figs. 8 and 9.

Couplings for pipes or tubes employed for conveying corrosive fluid presents special problems not ordinarily met in connection with pipes or tubes used for other purposes. An example of such special use of pipes for the transfer of highly corrosive fluids is met with in connection with the transfer of sulphite liquors in the paper industry and, accordingly, such use will be referred to herein as indicative of the use of pipes for other highly corrosive fluids and, accordingly it will be understood that the use of the present invention is not limited solely to its use for conveying sulphite liquors.

In the manufacture of paper by the sulphite process it is necessary to convey sulphite liquors to and from the digesters and other necessary apparatus by means of pipes or tubes, and also heat the material including the sulphite liquors in the digesters by circulating steam through coils of pipes in the digesters. Because of the corrosive quality of such sulphite liquors it has been found advantageous, for several reasons, to employ pipes or tubes made from alloy steels which are especially resistant to the corrosive effect of the sulphite liqours. The most commonly employed alloy steel is one which is commonly known as 18—8, and includes approximately 18% chromium and 8% nickel. This alloy steel is relatively expensive and for that reason it is preferable to employ thin wall tubing instead of pipe of ordinary thickness. In using thin wall tubing, however, the use of threaded couplings is obviated for the reason that if threads were formed on the end of the thin wall tubing there would not be sufficient stock left between the base of the threads and the inner wall of the tubing to withstand the work required, particularly to withstand it for any length of time in view of the corrosion of the tube that is bound to occur, and if a pipe of usual thickness is employed in order to provide sufficient stock under the groove of the thread then the body of the pipe is thicker than is necessary and a waste of metal results which unnecessarily increases the resultant cost. Furthermore, where the tubes are used to circulate steam through the digesters, the thin walled tubing is much more efficient than thick walled tubing in transferring the heat from the steam to the liquors in the digesters, this being particularly true in view of the fact that alloys of the type referred to are essentially poor conductors of heat. Accordingly, the common practice heretofore has been where two tubes are to be coupled together, to radially outwardly flare the adjacent ends of the tubing to provide complementary flanges. Clamping rings, encircling the tubes are drawn together by bolts and nuts for clamping the flanges together either with or without the interposition of suitable packing, to effect the coupling. Such a joint will usually effect a satisfactorily tight coupling but, in view of the fact that the tubes are usually of as great a length as is possible, the flanges must be formed cold and subsequent heat treating thereof is practically impossible. Steel alloys of the type described from which such tubes are formed have the characteristic of work hardening to an extreme degree, and such work hardening is particularly apparent at the junction of the flanges with the main body portion of the tube. It is also a characteristic of such metal that when hardened, as for instance in the manner described, they are materially more susceptible to the corrosive action of corrosive fluids than when in their soft and annealed condition. Furthermore, in conventional constructions of the type mentioned it will be understood that the tubes are not interiorly supported at the point of junction, which makes them subject to vibrations set up in the line piping of which they form a part, at the point of junction of the flanges and the main body portion of the tubing, and such vibrations exerted over such a limited area has the tendency of further work hardening the metal of the tube along this area and accordingly fosters a relatively rapid breakdown of the structure of the metal at this point. It is these undesirable features in connection with conventional types of couplings for tubing of the type described that the present invention is designed to overcome.

Referring now to Fig. 1, a coupling is shown constructed in accordance with the present invention joining the adjacent ends of two thin walled tubes 40 and 42 which are preferably formed of the 18—8 metal previously referred to, or other metal having similar corrosion resisting tendencies, although it is to be understood that the present invention is not limited, in its broader aspects at least, to the particular metal employed in the tubes. Received in the adjacent ends of each of the tubes 40 and 42 is the corresponding end of an inner sleeve 44 preferably formed from a corrosive resistant metal or alloy which may be, for instance, of the same composition as the tubes themselves. This sleeve, as best indicated in Fig. 2, at each end is externally provided with a cylindrical outer surface 46, and each surface 46 is bounded at its inner axial end with an axially inwardly and radially outwardly tapering frusto conical surface 47. The generatrices of the surfaces 47 are preferably disposed at an angle of between 5 degrees and 15 degrees to the axis of the sleeves 44, and preferably at an angle of 10 degrees as shown, although the construction will work satisfactorily up to angles of 45 degrees. The surfaces 46 merge at their inner ends into a central portion 48 which may be cylindrical in shape as indicated or any other desired configuration as, for example, those indicated in connection with the modifications to be described later.

It may be noted that in the type of tubes 40 and 42 employed for the purposes heretofore described, the inner and outer dimensions of the tubes are held to relatively close limits and both their inner and outer surfaces are brought to a relatively smooth and polished condition in manufacture. Accordingly, it is possible to make the cylindrical end portions 46 conform closely in outside diameter to the interior diameter of the tubes. As indicated in Fig. 1 the cylindrical end portions 46 are received within the corresponding ends of the corresponding tubes 40 and 42 and such ends are outwardly flared into complementary relationship with respect to the surfaces 46 and are received on such surfaces over the greater portion of the length thereof.

Surrounding each tube 40 and 42 is a collar member 50 which may be formed of a corrosive resisting metal or alloy, particularly where the joint is employed in heating coils within a digester. Each collar member 50 is provided with a cylindrical inner end surface 52 which relatively closely fits the outer diameter of the corresponding tube and a frusto-conical inner surface 54 which merges at one end with the surface 52 and is disposed at the same angle with respect to the surface 52 as the surface 47 with respect to the surface 46 previously described. The surface 54, as shown, engages the outer flared end portion of the corresponding tube. Each of the collars 50 is provided at its outer end with a radially outwardly extending flange 56, and the flanges 56 are each provided with a series of circularly arranged opposed openings 58 through which bolts 60 project. Nuts 62 threaded on the bolts 60 serve with the bolts to draw the flanges 56 toward each other, thereby clamping the flared ends of the tubes 40 and 42 securely between the frusto-conical surfaces 47 and 54 of the sleeve and collars respectively. Obviously, where the nuts 62 and bolts 60 are exposed to the effects of corrosive fluids, they are preferably formed from corrosion resisting material. Because of the fact that the inner and outer surfaces of the tubes 40 and 42 are smooth and polished, and because of the fact that the surfaces 47 and 54 of the sleeve and collars are brought to a like condition of finish, and because of the relatively small angle of the surfaces 47 and 54 with respect to the axes of the tubes which permits an unusually great clamping effect to be applied to the flared ends of the tubes, no packing is either necessary or desirable to prevent possible leakage at the joint.

In joining a pair of tubes by the mechanism described the steps indicated in Fig. 2 are followed. A collar 50 is first worked over the end of the tube, preferably to approximately the position it will assume with respect to the tube in the completed joint, and one end of the sleeve 44 is introduced into the corresponding end of the tube. Because of the fact that the inner cylindrical surface 52 of the collar 50 relatively closely receives the normal diameter of the tube 42 therein, the surface 52 will act as a guide for the sleeve 50 so that it will be properly located on the tube without danger of cocking, and because of the fact that cylindrical end surface 56 of the sleeve 44 relatively closely fits the normal inner diameter of the tube 42, the surface 56 will act as a guide for the sleeve 44 and the sleeve 44 will be accurately located axially of the tube 42 without danger of cocking. The sleeve 44 after the parts are in the position indicated in Fig. 2 is then forced further into the tube until the cylindrical surface 46 of the corresponding end of the sleeve is received within the cylindrical surface 52 of the collar 50, and the outer end portion of the tube 42 will, accordingly, be outwardly flared into complementary relationship with respect to the frusto conical surfaces 47 and 54 respectively. It will be observed that while the sleeve 44 is being forced into the tube to spread the end of the tube over the frusto-conical surface 47, the cylindrical guiding surfaces 46 and 52 are in more-or-less telescoping relation and, through the medium of the tube between them act to maintain each other in proper relative position to each other and to the tube, thus insuring against any possible misalignment or cocking. The mating collar 50 is then worked onto the corresponding end of the other tube and the tube is forced up on the remaining end of the sleeve 44 in substantially the same manner as indicated in Fig. 2, after which the bolts 60 are inserted and, with the cooperating nuts 62, are employed to draw the joint up into seated condition.

With the above described construction it will be apparent that the amount which the adjacent ends of the tubes 40 and 42 are worked in flaring them is so slight that no appreciable work hardening of the metal thereof occurs, and consequently even though the flared portion of the tubing was exposed to the corrosive action of the fluid within the tube it would not be rendered less resistant to the action of the fluid for such a reason. At the same time the adjacent ends of the coupled tubes are securely reinforced both internally and externally by the coupling members so that possibility of the tubes becoming work hardened due to vibration at the joint is materially lessened. Furthermore, because of the fact that the sleeve 44 is preferably formed from the same material as the tubes 40 and 42, or equivalent corrosion resisting material, the joint members are bound to withstand the corrosive action of the fluid at least equally as well as the tubes 40 and 42.

While the sleeve 44 is made of ample thickness to withstand any stresses to which it is liable to be subjected to in service, it will be observed that it is not of such thickness as materially restricts the flow of fluid through it, and any such tendency towards restriction is minimized by outwardly flaring its inner walls adjacent the ends thereof as at 64 and rounding off the extreme edge portions of the flared parts so as to cause the bore of the sleeve to assume a somewhat Venturi-like shape which thereby further aids in reducing the effect of any restriction the sleeve 44 might otherwise offer.

This interior shaping of the sleeve to Venturi-like formation may be carried to a greater extent as indicated in Fig. 3 in which all of the parts shown are identical to those in Fig. 1 with the exception of the sleeve, and accordingly equivalent parts and surfaces in Fig. 3 are indicated by the same numerals as in Fig. 1 with the exception that the numerals in Fig. 3 bear the submark $a$. It will be noted that the sleeve 44$a$ is identical to the sleeve 44 except for the change in shape of the inner surface 66 which is shown as being shaped to provide a substantially true venturi. In such a joint it would of course be important to assemble the sleeve 44$a$ with respect to the tubes 40$a$ and 42$a$, that the throat of the venturi be located at that end of the sleeve 44$a$ toward which the fluid flows.

In Figs. 4 and 5 is shown another modification of the construction shown in Fig. 1 and in these figures parts of the parts and surfaces corresponding with equivalent parts and surfaces of Fig. 1 are indicated by the same numerals except that they bear the submark $b$. In this construction the parts are substantially the same as in Fig. 1 with the exception that the central portion 48 of the sleeve 44 in Fig. 1 is in this case lengthened axially and increased in radial dimension as at 48$b$ and is peripherally threaded. The collars 50$b$, instead of having flanges 56 as in Fig. 1, are provided with enlarged internally threaded ends 68$b$ which are octagonally or otherwise peripherally shaped for the purpose of enabling them to properly receive a wrench. The clamping effect in this case is of course obtained by threading the collars 50$b$ upon the portion 48$b$ of the inner sleeve until the flared ends of the tubes are held in proper clamped relation between the sleeve 44$b$ and the collars 50$b$.

The modification shown in Figs. 6 and 7, in which like parts and surfaces are indicated by like numerals bearing the submark $c$, is essentially like that illustrated in Figs. 4 and 5 with the exception that the sleeve 44$c$ is substantially identical to the sleeve 44 employed in Fig. 1 and one of the rings 50$c$, instead of being provided with a flange, is peripherally threaded as at 70, while the other sleeve 50$c$ is formed to provide a shoulder 72. A nut member 74, provided with a shoulder complementary to the shoulder 72, threadably engages the threaded end 70 and by this means causes the collars 50c to be drawn together to properly clamp the flared ends of the tubes 40c and 42c against the sleeve 44c.

A further problem arises in connection with the type of tubing herein under consideration in joining it to the various fittings or parts necessarily employed in connection with lines of piping and which includes, for instance, valves, T's, L's, tank fittings and the like. In valves, for instance, which may be considered as an example of other fittings or parts, the conventional practice has been to provide a relatively heavy flange on the end of the valve body and either thread the end of the tube into it, weld the tube to it, but generally to outwardly flare the end of tube in substantially the same manner as previously described in connection with conventional types of tube fittings, back the flange up with a ring and clamp the flange on the tube between the flange on the valve body and ring by means of bolts and nuts, usually with the addition of a gasket between the flanges. Not only is this construction subject to the same disadvantages discussed in connection with conventional types of tube fittings due to the work hardening of the end of the tube in outwardly flanging it to the degree indicated, but further difficulties are met with in connection with the valve body itself. These valve bodies or corresponding parts are cast from a corrosion resisting metal or alloy, usually of the same composition as the tube, and the flange thereon is necessarily made relatively large and heavy. This not only adds a relatively large amount of expensive material to the construction, but more important it is a common occurrence to find that cracks have developed at the point of connection between the valve body and its flange due to the contraction of the cast metal in the heavy flange in cooling and pulling away from the connected thin section. Even though such cracks do not appear on the surface, the metal at this point is liable to be rather weak and spongy and less resistant to the attack of the corrosive fluid than the other areas of the part.

In accordance with the present invention these disadvantages are obviated in the manner shown in Figs. 8 to 10 inclusive in which the valve body 100, instead of being provided with an integral flange as in conventional constructions, is provided with a tubular extension 102 which is substantially equivalent to one-half of the sleeve 44 in Fig. 1 except that the central portion 48d is slightly enlarged and the valve body thereof is formed to provide a relatively small radial shoulder 104. The amount of metal required to form the sleeve portion 102 and central portion 48d is relatively small and accordingly no difficulty such as the formation of cracks between the valve body and flange in conventional constructions is encountered.

In this construction the end of the tube 106 which is connected to the body 100 is clamped on the end of the sleeve 102 by a collar 50d drawn into place by bolts 60d and nuts 62d extending through the flange 56d of the collar 50d and a ring indicated generally as at 108 bearing against the shoulder 104. This ring may be made up of a plurality of identical sections, the particular embodiment shown by way of illustration having three sections 110, one of which is shown in perspective view in Fig. 10. Each section 110 is semi-annular in shape and is preferably cut away as at 112 for half its thickness and one-third its length at one side and at one end, and similarly cut away as at 114 on the opposite side of the other end. The sections 110 are assembled around the end of the valve body 100 against the shoulder 104 so that the end 112 of one section overlaps the end 114 of the next adjacent section, thereby effecting a continuous ring of equal thickness throughout. The bolts 60d extend through matching openings 116 in the overlapping end portions of the sections 110 and thereby maintain the sections in properly assembled relationship. In view of the fact that sections 110 may be made of any ordinary metal, it will be apparent that with this construction not only is the liability of cracks and flaws in the valve body eliminated, but a less expensive construction is provided.

Formal changes may be made in the specific embodiment of the invention described without departing from the spirit or substance of the broad invention, the scope of which is commensurate with the appended claim.

We claim:

Coupling means for thin walled corrosion resisting steel tubes comprising an inner sleeve member having a cylindrical outer surface of a diameter to be relatively closely received in the normal bore of the tube to be coupled thereby to serve as a guide for said tube, a frusto-conical surface on said sleeve member concentric with the axis of said sleeve and directly merging at its smaller end with said cylindrical surface and adapted to be at least partially and closely received within a correspondingly shaped end of said tube, an external collar surrounding said tube and having an inner cylindrical surface forming a guide for said collar on the normal diameter of said tube and a frusto-conical inner surface complementary to the outer surface of the end of said tube, the cylindrical and frusto-conical surfaces respectively on said inner sleeve and external collar being co-extensive and truly parallel when the coupling is assembled on a tube, and means for moving said collar axially of said sleeve to clamp the end of a tube therebetween.

GABRIEL E. BLAGG.
RUDOLPH F. FLINTERMANN.